UNITED STATES PATENT OFFICE.

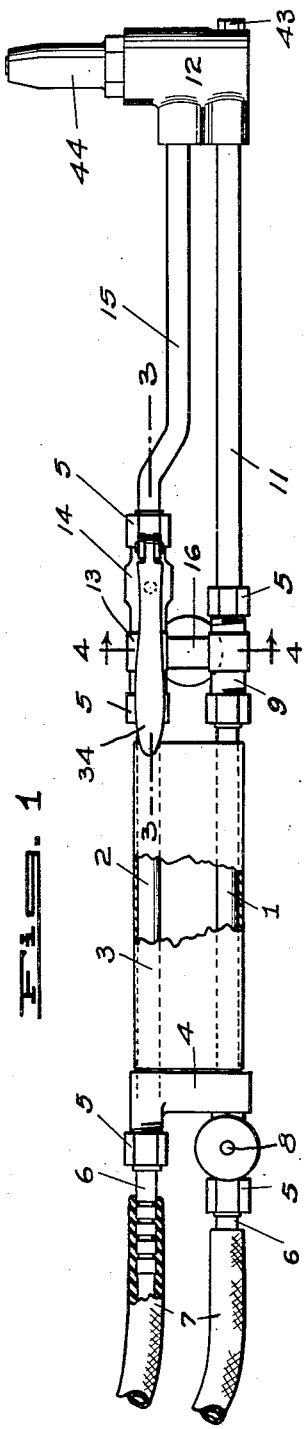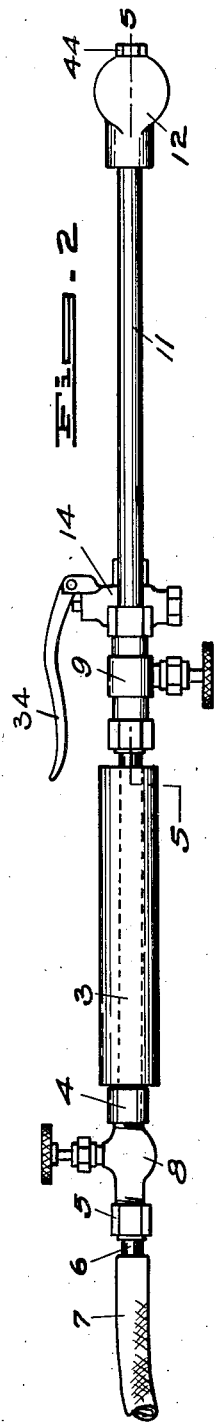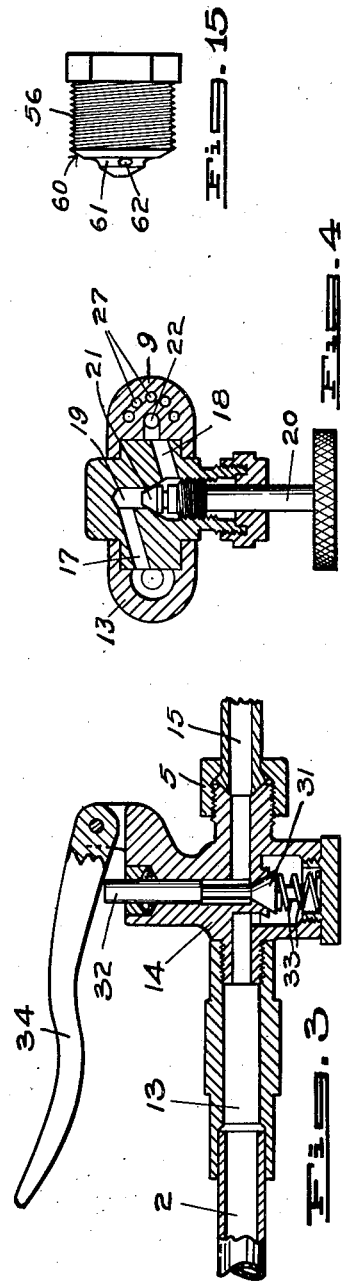

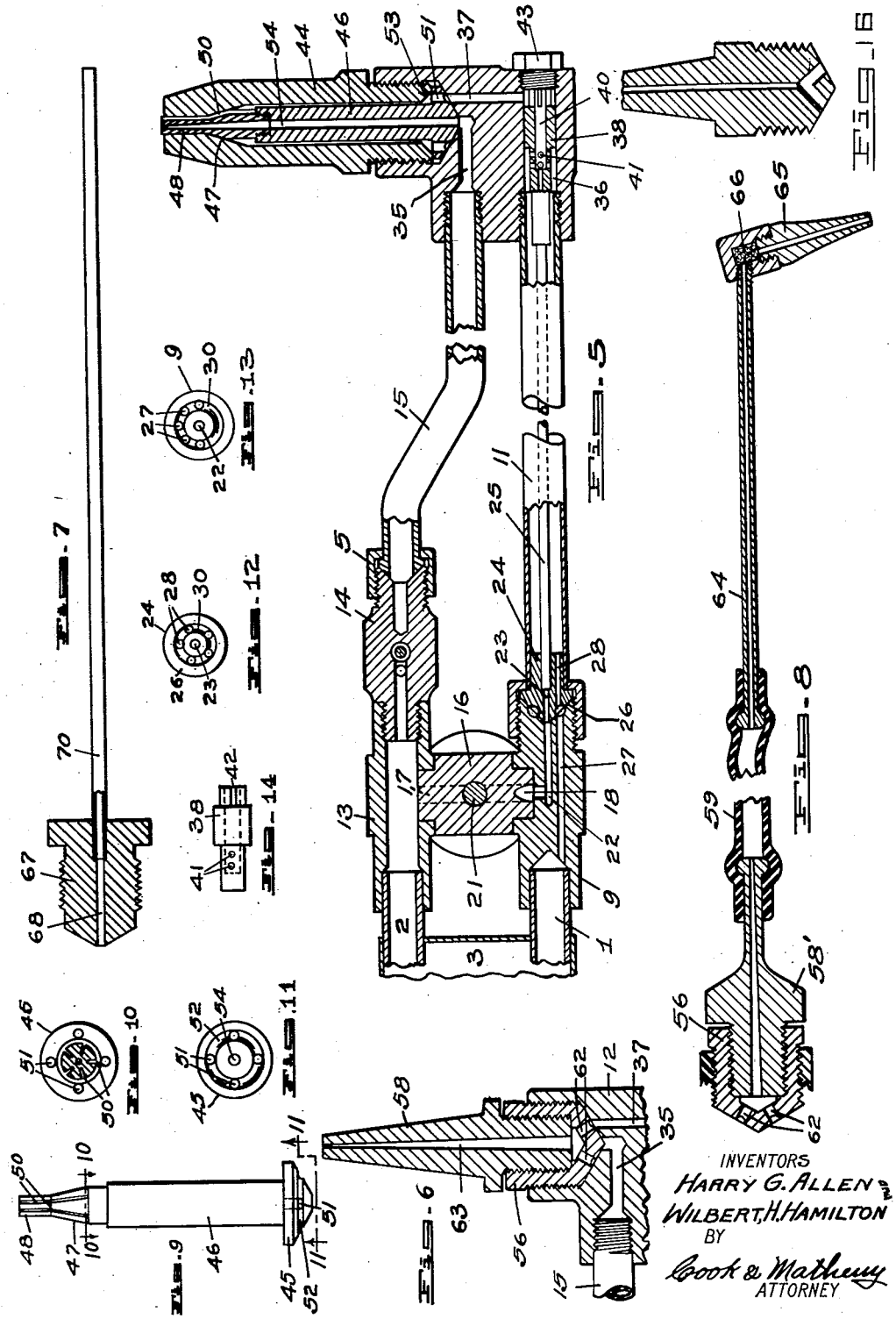

HARRY G. ALLEN AND WILBERT H. HAMILTON, OF SEATTLE, WASHINGTON; SAID HAMILTON ASSIGNOR OF HIS ENTIRE INTEREST TO SAID ALLEN.

TORCH.

1,370,258.      Specification of Letters Patent.      Patented Mar. 1, 1921.

Application filed July 2, 1917. Serial No. 178,867.

*To all whom it may concern:*

Be it known that we, HARRY G. ALLEN and WILBERT H. HAMILTON, citizens of the United States, residing at Seattle, in the county of King and State of Washington, have invented a new and useful Improvement in Torches, of which the following is a specification.

This invention relates to improvements in torches of the class that commonly employ oxygen or inflammable gas or a mixture of the two for the purpose of autogenous welding, cutting of metals and the removal or burning of carbon out of the cylinders of internal combustion engines.

The object of this improvement is to provide a torch of a simple and durable form of construction that may be converted at will into a welding, cutting, carbon burning or lead burning torch.

This object is accomplished by the novel arrangement of passageways in the torch head and by providing a bushing that may be inserted in the torch head to close certain of these passageways when welding or lead burning is to be done.

The novel features of the invention reside in the provision of a cutting torch having only two external tubes to convey gases to the torch head; in the novel arrangement of the gas passageways within the torch head and the provision of a bushing by the use of which the device may be quickly and easily converted from a cutting torch into a welding or lead burning torch; in the provision of a valve controlled by-pass from the oxygen to the inflammable gas tube; in the provision of an improved form of gas mixing device and welding tip and in other improvements in the form of construction as will be more clearly hereinafter pointed out.

This torch is designed for four separate uses, namely autogenous welding, cutting of metals, removal or burning of carbon from cylinders of internal combustion engines and lead burning. It is customary in automobile garages, machine shops and like places to employ a separate torch for each of these purposes, thus necessitating the purchase of four separate outfits. This convertible form of torch requires only a small amount of mechanism in addition to that commonly embodied in the ordinary cutting torch and can consequently be sold cheaper than the four outfits above named thus making it desirable for garages and smaller machine shops where the cutting and welding torches are not used continuously.

In the drawings Figure 1 is a plan view of a torch constructed in accordance with this invention; Fig. 2 is a view in elevation of the same; Fig. 3 is an enlarged view in cross section on broken line 3, 3 of Fig. 1; Fig. 4 is an enlarged view in cross section on broken line 4, 4 of Fig. 1; Fig. 5 is an enlarged view in longitudinal mid section of the device substantially on broken line 5, 5 of Fig. 2 certain parts being broken away and certain other parts being shown in elevation; Fig. 6 is a fragmentary view in cross section of the torch head illustrating the method of converting the device into a welding torch; Fig. 7 illustrates the carbon burning devices; Fig. 8 is a sectional view illustrating the lead burning devices; Fig. 9 is a view in elevation of a portion of the cutting tip; Figs. 10 and 11 are views in cross section and elevation on broken lines 10, 10 and 11, 11 respectively of Fig. 9; Figs. 12 and 13 are views in elevation illustrating details of the means of making connections for the passage of gas and oxygen; Fig. 14 is a view in elevation illustrating a mixing device that is placed in the torch head, Fig. 15 is a view in elevation of a bushing used in connection with the welding and lead burning tips, and Fig. 16 is a fragmentary sectional view showing a slightly modified form of construction of a welding tip.

Referring to the drawings throughout which like reference numerals indicate like parts, the numerals 1 and 2 indicate a supply pipe for hydrocarbon gas and an oxygen supply pipe respectively that extend lengthwise in substantially parallel spaced relation through an oval shaped jacket 3 that forms a hand hold for the torch and are connected by means of a cross yoke 4 and unions 5 with hose connections 6 over which are fitted the ends of hose 7 that may lead to and be connected with a source of supply of inflammable gas and a source of supply of oxygen respectively.

The pipe 1 is provided with a valve 8 interposed between the yoke 4 and the union 5 by which the passage of gas through such pipe may be controlled.

The pipe 1 is connected with a gas conductor 9 that in turn is connected by a union 5 with another pipe 11 that leads to and is connected with a torch head 12.

The pipe 2 is connected by means of an oxygen conductor 13 and valve casing 14 with another pipe 15 that is connected with the torch head 12.

The members 9 and 13 are preferably of cast metal and are ground for the reception of the ends of a cross member 16, Figs. 4 and 5, that serves as a valve casing and is provided with longitudinally disposed angular passageways 17 and 18 and with a transverse bore 19 wherein is screwed a valve stem 20.

The passageways 17 and 18 connect with the bore 19 at points offset with respect to each other and the bore 19 is provided between the two points of connection with passageways 17 and 18 with a conically shaped valve seat for the reception of a valve piston 21 on the end of the stem 20. By this arrangement as clearly shown in Fig. 4 a valve controlled by-pass between the members 9 and 13 is established.

The passageway 18 communicates with a central passageway 22 in the member 9 that in turn communicates through a passageway 23 in a plug 24 with a small tube 25 disposed axially within the pipe 11.

The plug 24 fits within the end of the pipe 11 and has a conical end 26 that interfits a conical recess in the end of the member 9.

Communication between the pipe 1 and pipe 11 is had through a plurality of passageways 27 in the members 9, (see Fig. 13) and a plurality of similar passageways 28 in the plug 24, (see Fig. 12).

The passageways 27 and 28 all terminate in annular grooves 30 in the respective faces of the plug 24 and member 9 so that communication is established whether the passageways register or not.

By the construction just described separate communication between the pipes 1 and 11 and the pipes 2 and 25 is established.

The valve casing 14, Fig. 3, is provided with a central bore that terminates in a valve seat for the reception of a valve plug 31 on a valve stem 32 and normally held in closed contact with the valve seat by a spring 33. The outer end of the valve stem projects from the end of the valve casing and is engaged by a trigger 34 by which it may be easily depressed to open the passageways through the valve and establish communication between the pipe 2 and the pipe 15.

The pipe 15 communicates with a passageway 35 in the torch head 12 that terminates in axial alinement with the tip receiving socket on such head and the pipe 11 communicates by means of two passageways 36 and 37 in the torch head that are disposed at right angles to each other with the tip receiving socket eccentric to the axis thereof.

The passageway 36 is disposed in alinement with the pipe 11 and is large enough for the reception of a gas mixer 38, Figs. 5 and 14, that mixes the gases from the pipes 11 and 25 respectively before they pass through the passageway 37 to the welding or cutting tip.

The mixer 38 is of reduced size at its inner end to leave a passageway on the outside thereof for the gas from the pipe 11 and is provided with an internally disposed mixing chamber 40 that communicates directly with the pipe 25 and by perforations 41 with the pipe 11. The outer end of the mixer from which the mixed gases are discharged is of reduced size and provided with cross slots 42 through which the gases must pass outwardly before entering the passageway 37.

The outer end of the mixer is permitted to butt against the end of a plug 43 that is screwed into the torch head so that the mixer may be easily removed when this plug is taken out.

For cutting purposes a tip housing 44 bored for the reception of an axially disposed plug 46 is provided, the housing being adapted to be screwed into the torch head as shown in Fig. 5.

The plug 46 is provided with a head 45 and has a tip secured in the outer end thereof that consists of a tapered portion 47 having a reduced end member 48, see Fig. 9.

The plug 46 fits loosely within the bore of the tip housing 44 so that a passageway for gas is left around the outside thereof and the tip portion is provided with externally disposed longitudinal slots 50 through which gas may be emitted.

The outer side of the head 45 is of conical shape to interfit the conically shaped end of the recess in the torch head and is provided with perforations 51 that extend through the flanged portion of such head and terminate in an annular groove 52 on the cone shaped side of the head that registers with the passageway 37.

The inner side of the head 45 is adapted to be engaged by the end of the housing 44 which is beveled as at 53 to provide a passageway for gas that enters through the perforations 51.

The plug is provided with a concentric bore 54 that communicates at its inner end with the passageway 35 and at its outer end with a similar bore in the tip.

By the arrangement just described the oxygen from the pipe 15 is delivered in a jet from the concentric bore in the end of the tip and the mixed gas is delivered from the slots 50 that are arranged around the bore 54 but do not communicate therewith.

For welding purposes it is desired to shut off the supply of oxygen from the pipe 15 and use only the mixed gases from the pipes 11 and 25. This is accomplished by inserting a bushing 56 in the head 12 (see Figs. 6 and 15) and then screwing the welding tip 58 into the bushing.

The bushing is formed with a conically shaped end 60 that interfits the socket in the end of the torch head 12 and the apex of which projects slightly into and closes the opening to the passageway 35 thus shutting off the supply of pure oxygen.

The conically shaped end 60 of the bushing is provided with an annular groove 61 that registers with the passageway 37 and with perforations 62 leading from such groove to the central opening thereof through which gases may pass to the welding tip 58.

The welding tip is provided with a concentric tapered bore 63 through which the gases are emitted.

This bushing constitutes an important part of the invention since it serves as a means of cutting off the supply of pure oxygen and makes it possible to use an ordinary form of welding tip in a cutting torch.

The tips 58 are made in various sizes for use on various classes of work.

The lead burning outfit is made by constructing a welding tip 58' so that it is adapted to have one end of a light rubber hose 59 slipped thereover and then inserting a tube 64 in the other end of the hose, the tube having a tip 65 thereon that is similar to a small welding tip except that it is provided with a recess wherein is disposed gauze or packing 66 through which the gas must pass before being emitted therefrom.

The tip 58' may be the smallest welding tip that goes with the set.

The lead burning outfit may be used on any light and delicate work in the nature of welding since it is relatively small and light and easy to handle.

In the burning or removal of carbon from the cylinders of internal combustion engines oxygen alone is used, hence the carbon burning outfit, Fig. 7, consists of a plug 67 adapted to be screwed into the head 12 and having a conically shaped end that interfits the end of the socket in the torch head and closes the passageway 37, thus shutting off the mixed gases.

The plug 67 is provided with a concentric bore 68 that registers with the oxygen passageway 35 and has a relatively small metal tube 70 inserted therein and projecting outwardly therefrom by which the oxygen may be directed to any desired point in the engine cylinders.

If desired the welding tip 58 and bushing 56 may be made in one integral piece and the passageways 62 made to communicate with the bore 63 as shown in Fig. 16 but owing to the fact that there are usually several of the tips with each set it is found cheaper to construct one bushing and make the several tips to be inserted therein in the manner shown.

In operation when the torch is to be used for cutting purposes the tip apparatus shown in Fig. 5, is employed and the valve in the by-pass between the two torch pipes may be opened so that a mixture of inflammable gas and oxygen will issue from the slots 50 in the tip and pure oxygen will issue from the small perforation in the center of the tip, the flow of pure oxygen being controlled by the trigger valve 31.

The device may be readily converted into a welding torch by inserting the bushing 56 into the torch head and then inserting the welding tips into the bushing.

When the bushing is inserted it is impossible to permit the passage of pure oxygen through the passageway 35 even though the trigger valve is opened.

It is obvious that changes in the form of construction of the various parts of this torch may be made within the scope of the claims without departing from the spirit of the invention.

What we claim and desire to protect by Letters Patent is:—

1. The combination with a torch head provided with a socket, said socket having a cone shaped recess in its bottom, said torch head having a passageway for oxygen that intersects the center of said cone shaped recess and a passageway for inflammable gas that intersects said cone shaped recess at a point removed from the center thereof, of a welding tip adapted to be inserted in said socket, said welding tip having means provided with a cone shaped end that normally closes said oxygen passageway, and openings that communicate with said inflammable gas passageway.

2. A torch of the class described comprising an oxygen pipe and a pipe for inflammable gases, a torch head connected with said pipes, said torch head having a tip receiving socket and being provided with separate passageways that connect said socket with said oxygen pipe and said inflammable gas pipe respectively, valves controlling the passage of gases through said pipes, an oxygen tube disposed within said pipe for inflammable gases, a valve controlled by-pass connecting said oxygen pipe and said oxygen tube, a gas mixer in said torch head for mixing oxygen from said tube and inflammable gas from said pipe, and a bushing adapted to be inserted in said socket to close said oxygen passageway when said torch is to be used for welding purposes.

3. A convertible cutting and welding torch comprising a torch head having a socket formed with a cone shaped recess in its bottom and having a passageway that terminates in the center of said recess and another passageway that terminates in the bottom of said recess at a point removed from the center and a bushing having a welding tip connected therewith said bushing being adapted to close said central passageway and having openings that communicate with said passageway that terminates at a point removed from the center.

4. In a convertible cutting and welding torch, a torch head provided with a socket having a conical recess in its bottom end and having an oxygen passageway that intersects the center of said conical recess and a passageway for inflammable gas that intersects said conical recess at a point removed from the center, a hollow bushing arranged to fit within said socket and having a conical end adapted to close the passageway that intersects the center of said conical recess, said conical end having an annular groove that registers with said passageway for inflammable gas and having perforations intersecting said groove and extending through the conical end wall thereof and a welding tip adapted to fit within said bushing.

Signed by us at Seattle, Wash., this 26th day of June, 1917.

HARRY G. ALLEN.
WILBERT H. HAMILTON.

Witnesses:
E. B. HERALD,
F. C. MATHENY.